(12) United States Patent
Cotichini et al.

(10) Patent No.: US 8,150,896 B2
(45) Date of Patent: Apr. 3, 2012

(54) AUDITING TOOL FOR A LEGACY SOFTWARE MODERNIZATION SYSTEM

(75) Inventors: Christian Cotichini, Vancouver (CA); Michael E. F. White, Vancouver (CA); David John Green, Surrey (CA)

(73) Assignee: MAKE Technologies, Inc., Vancouver, British Columbia (CA)

( * ) Notice: Subject to any disclaimer, the term of this patent is extended or adjusted under 35 U.S.C. 154(b) by 364 days.

(21) Appl. No.: 11/963,683

(22) Filed: Dec. 21, 2007

(65) Prior Publication Data

US 2009/0164492 A1 Jun. 25, 2009

(51) Int. Cl.
G06F 17/30 (2006.01)
(52) U.S. Cl. ........................ 707/810; 707/687
(58) Field of Classification Search .................. 707/810, 707/687
See application file for complete search history.

(56) References Cited

U.S. PATENT DOCUMENTS

| | | | | |
|---|---|---|---|---|
| 4,965,800 A * | 10/1990 | Farnbach | ...................... | 714/724 |
| 5,319,453 A * | 6/1994 | Copriviza et al. | .................. | 346/6 |
| 5,463,768 A * | 10/1995 | Cuddihy et al. | ................ | 714/37 |
| 5,708,828 A * | 1/1998 | Coleman | ........................ | 715/205 |
| 5,761,510 A * | 6/1998 | Smith et al. | .................... | 717/124 |
| 6,081,798 A * | 6/2000 | Johnson et al. | .................. | 706/54 |
| 6,334,158 B1 * | 12/2001 | Jennyc et al. | .................. | 719/328 |
| 6,367,068 B1 * | 4/2002 | Vaidyanathan et al. | ...... | 717/143 |
| 6,505,200 B1 * | 1/2003 | Ims et al. | .......................... | 707/8 |
| 6,549,949 B1 * | 4/2003 | Bowman-Amuah | .......... | 709/236 |
| 6,587,857 B1 * | 7/2003 | Carothers et al. | ............. | 707/102 |
| 7,010,501 B1 * | 3/2006 | Roslak et al. | .................... | 705/26 |
| 7,778,982 B2 * | 8/2010 | Baker | .......................... | 707/694 |
| 7,873,666 B2 * | 1/2011 | Sauermann | .................... | 707/793 |
| 2002/0010912 A1 * | 1/2002 | Kasvand et al. | .................. | 717/4 |
| 2002/0072927 A1 * | 6/2002 | Phelan et al. | ...................... | 705/1 |
| 2003/0187849 A1 * | 10/2003 | Ruby et al. | ...................... | 707/10 |
| 2005/0080803 A1 * | 4/2005 | Sauermann | .................... | 707/101 |

OTHER PUBLICATIONS

Tuuri, Re: errno 150—foreign key problems, Jun. 12, 2006, available at http://forums.mysql.com/read.php?22,95361,95665#msg-95665.*

* cited by examiner

Primary Examiner — James Trujillo
Assistant Examiner — William Spieler
(74) Attorney, Agent, or Firm — Alleman Hall McCoy Russell & Tuttle LLP (57) ABSTRACT

A database modernization auditing system and method is disclosed. One embodiment comprises a method for loading a legacy data object, transforming the legacy data object into a modern data object according to a rule set, wherein transforming the legacy data object into the modern data object further includes abstracting at least a portion of the legacy data object into semantic information and transforming the semantic information into the modern data object, and generating an audit log entry corresponding to an error that occurs while transforming the semantic information into the modern data object, wherein the audit log entry contains a unique identifier that relates the audit log entry with the legacy data object.

17 Claims, 8 Drawing Sheets

TOP MENU SUMMARY DATA

AUDITING TOOL FOR A LEGACY SOFTWARE MODERNIZATION SYSTEM

TECHNICAL FIELD

The present invention relates generally to business systems and software, and more particularly to legacy data system modernization, with an auditing tool.

BACKGROUND

One of the greatest infrastructure challenges in organizations today is the reliance on database systems created and maintained over a period of time much longer than their anticipated lifespan. Many of these systems were created with numerous limitations and restrictions due to technological restraints of the time period. Over time, technology has rapidly improved and many of these systems have become outdated and inefficient. As a result, many organizations are looking for a viable approach to modernize their legacy database systems.

Past attempts at legacy database modernization have generally included direct software updates and/or data conversions. A first approach to legacy database modernization involves creating a new data store and uploading an entire legacy database into the new store in a single modernization attempt. One problem with this approach is that undetected flaws in the modernization software may result in unacceptable amounts of lost and/or destroyed data.

Another approach to legacy database modernization involves performing a record by record conversion of legacy source data into a new data store format. Although the occurrence of lost and/or destroyed data may be reduced, this approach may be both time-consuming and cost-prohibitive.

Furthermore, the ability to identify inefficiencies within today's data modernization systems is limited. Typically, the ability of a user of a data modernization system is limited to a flat-formatted file that reports aggregate success-failure rates for an entire data transformation/migration. Thus, a user of current data modernization system does not have the ability to pinpoint specific trouble spots within a data modernization system.

SUMMARY

According to one aspect of the invention, a database modernization system is provided that may include a data migration workbench audit tool (DMWA tool). The DMWA tool is typically configured with a graphical user interface that may allow a system user to view audit log statistics that may be indicative of the overall efficiency of a data migration/transform in a user-friendly presentation. A system user may then utilize these statistics to analyze and subsequently make improvement modifications to a database modernization system.

A database modernization auditing system and method is disclosed. One embodiment comprises a method for loading a legacy data object, transforming the legacy data object into a modern data object according to a rule set, wherein transforming the legacy data object into the modern data object further includes abstracting at least a portion of the legacy data object into semantic information and transforming the semantic information into the modern data object, and generating an audit log entry corresponding to an error that occurs while transforming the semantic information into the modern data object, wherein the audit log entry contains a unique identifier that relates the audit log entry with the legacy data object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF DRAWINGS

The disclosure is illustrated by way of example and not by way of limitation in the figures of the accompanying drawings, in which the like references indicate similar elements and in which.

DETAILED DESCRIPTION

Figure 1:
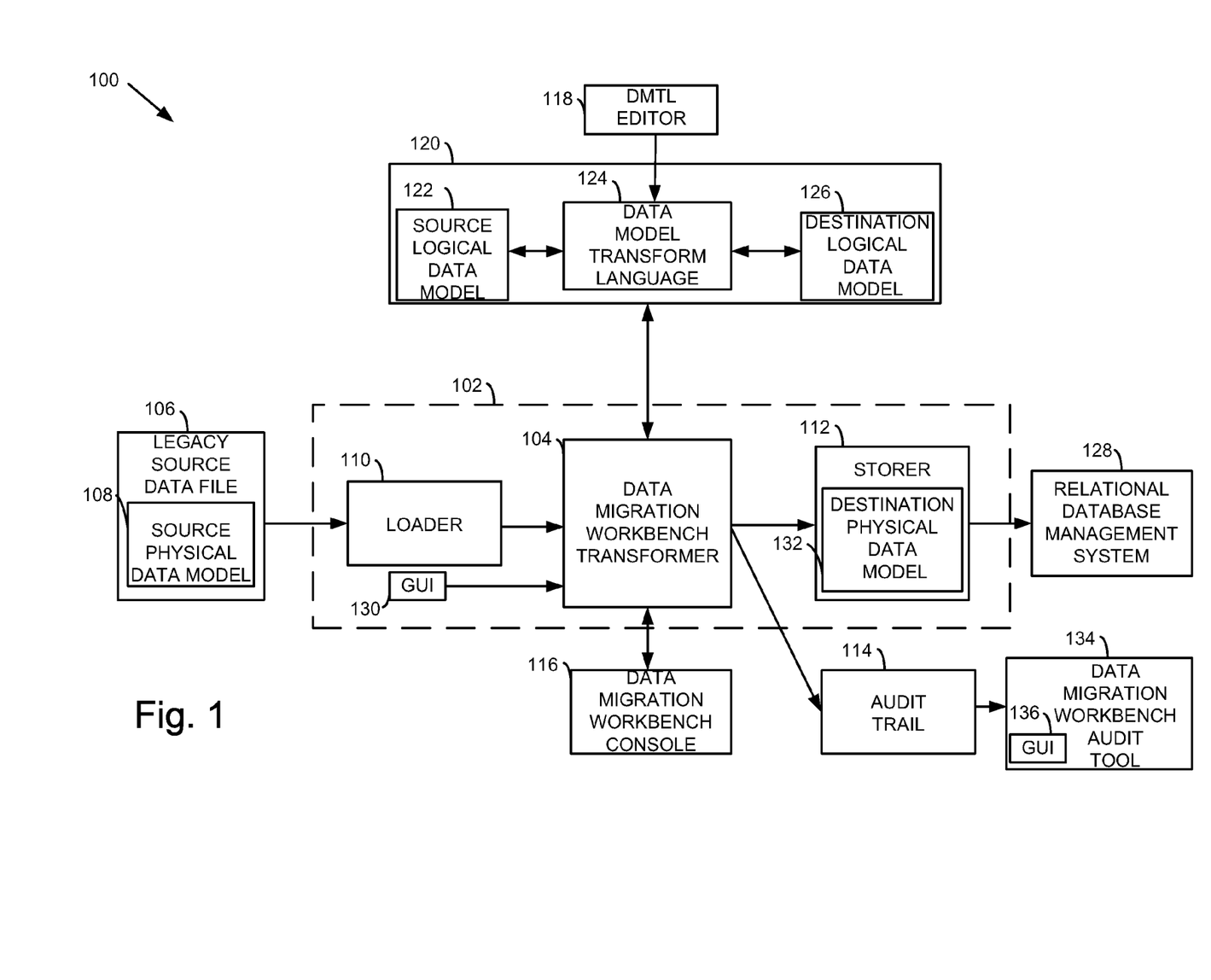
FIG. 1 is a schematic diagram of an exemplary embodiment of a data modernization system with an audit interface tool.

One exemplary embodiment of a data modernization system is schematically illustrated in FIG. 1. Data Modernization system 100 may include a legacy data source file 106 that encompasses a source physical data model 108 format. As a non-limiting example, legacy data source file 106 may be configured as a flat file export of a proprietary binary format. Source physical data model 108 may be configured as a lower-level representation of the physical data layout of legacy source data file 106, for example a physical data model 108 may be defined as a character with a length of 1 or as a string of length 20.

Data modernization system 100 may also include conversion engine 102. Conversion engine 102 may include loader 110, data migration workbench transformer (DMWT) 104, GUI 130 storer 112, and destination physical data model 132. Loader 110 may interface with legacy data source file 106 to parse the legacy data into an internal representation such as a document object model (DOM). In some embodiments, the legacy data may be a record that is parsed into an internal representation that conforms to a source logical data model 122 format. A logical data model provides semantic information more readily understood by a human user and therefore is not as implementation specific as the physical data model. Additionally, loader 110 may also validate source data file 106 against source physical data model 108. Values that are not in conformance with the source physical data model may be deemed violations by DMWT 104 and subsequently logged as violations by audit trail 114. For example, dates might be stored in the source data as eight digit text strings such as YYYYMMDD. Thus, a non-eight digit string or a string that included a non-number symbol may be logged as one or more violations by audit trail 114. Audit trail 114 may be configured to log sets of distinct audit units created during a data modernization run. Each audit unit may contain a unique identifier that may be used to identify the source data record related to each audit unit. Storer 112 may be configured to translate data records received from DMWT 104 conforming to destination logical data model 126 and then pass them on to RDBMS 128. Like source physical data model 108, destination physical data model 132 may be configured as a low-level representation of the physical data layout of the target database (RDBMS 128).

Data modernization system 100 may also include logical data model interface 120, which may be configured as a module that represents the logical, abstracted referencing of the names used in legacy data source file 106 and a relational database management system 128. Logical data model interface 120 may in turn encompass source logical data model 122, destination logical data model 126, and data migration transform language (DMWTL) 124. DMWT 104 may access logical data model interface 120 to create a destination logical data model via DMWTL 124 that may be based in part on source logical data model 122. DMWTL 124 may utilize reference names included within source physical data model 108 and destination logical data model 126. Furthermore, DMWT 104 may read both the source and destination logical models and use them to validate legacy source data file 106. For example, entity and field names within data source 106 may be validated against both the source and destination logical models to ensure the accuracy of destination logical data model 126.

Data modernization system 100 may further include data model transform language (DMTL) editor 118 and data workbench migration console (DMWC) 116. DMWTL editor 118 may be a program accessed by a user via GUI 130 and logical data model interface 120 to update and modify a rule set (as described in further detail with regard to FIG. 2) embodied by DMWT 104 so as to improve the accuracy of the transform/migration process of DMWT 104. DWMC 116 may provide a user real-time data via DMWT 104 and GUI 130 to assess the efficiency and performance of the data conversion process through data conversion engine 102 (e.g. number of records modernized per second, total violations, memory used, etc.).

Each data record that is successfully uploaded by loader 110 from legacy source data file 106 may then be processed by DMWT 104. A rule set (as described in further detail with regard to FIG. 2) within DMWT 104 may be applied to each data element (datum) to ensure that each data datum passed to storer 112 is of the data object format defined by source physical data model 108 and also concurs with destination physical data model 132 and destination logical data model 126. Once encapsulated as an instantiated data object by storer 112, data objects may then be stored in various relational database management systems 128, such as an Oracle® database management system, as one example.

Data modernization system 100 may further include data migration workbench audit tool (DMWA tool) 134. DMWA tool 134 may be configured as a web interface tool such that a user of data migration workbench transformer 104 may view various audit statistics pertaining to a specific transform/migration data run compiled from violation logs reported to audit trail 114 (as described in further detail with regard to FIG. 2) via GUI 136. The calculation and user-friendly presentation of certain audit statistics via DMWA tool 134 may allow a system user to quickly implement changes to rule set 208 embodied by DMWT 104 that increase the overall migration/transformation performance of conversion engine 102.

Figure 2:
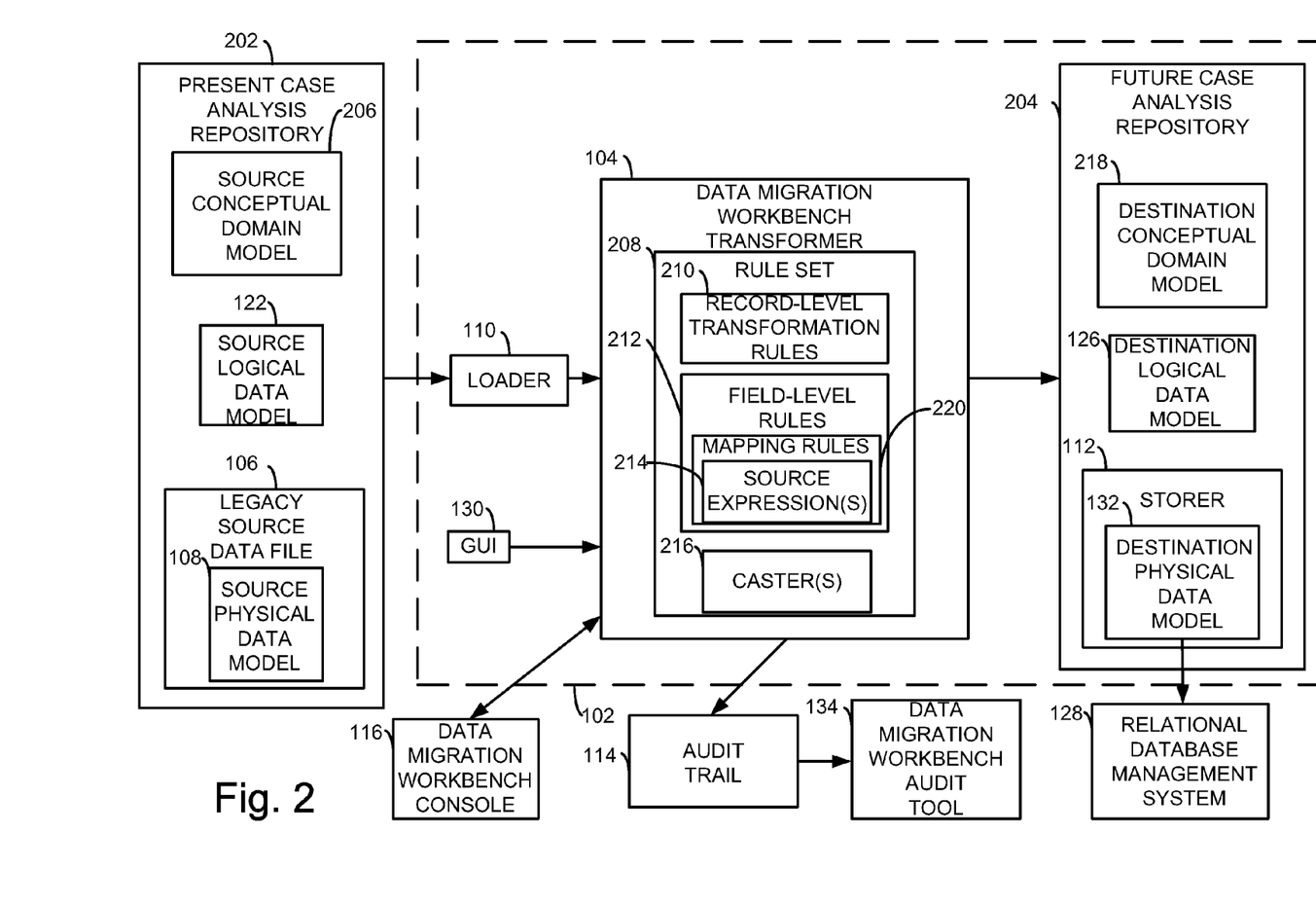
FIG. 2 is a schematic diagram of the data modernization system and data migration workbench audit tool of FIG. 1 that depicts another representation of the overall data migration flow through conversion engine 102.

FIG. 2 is a schematic diagram of the data modernization system and data migration workbench audit tool of FIG. 1 that depicts another representation of a data migration flow through conversion engine 102. In this example, legacy source data may flow from present case analysis repository (PCAR) 202 through conversion engine 102 to RDBMS 128 via loader 110, DMWT 104, and future case analysis repository (FCAR) 204. PCAR 202 may include legacy source data file 106 which may be further defined by source data physical model 102. PCAR 202 may also include source logical data model 122 and source conceptual domain model 206 which may be mapped by a system programmer.

FCAR 204 may include destination conceptual domain model 216, destination logical data model 126, and storer 130 which may be further defined by destination physical data model 130. Destination conceptual domain model 218 and destination physical data model 132 may be mapped and defined by a system programmer. A relational database management system may access storer 112 within FCAR 204 to download data objects that have been stored within storer 112.

Each data element (datum) that is successfully uploaded by loader 110 from legacy source data file 106 may then be processed by DMWT 104. DMWT 104 may include rule set 208. Rule set 208 may be applied to a legacy data object to transform the legacy data object into a modern data object. A legacy data object may be a field, a data record, an arbitrarily defined set of data records, an entire database, or other individually transformable data object. Rule set 208 may include record-level transformation rule(s) 210, field level rule(s) 212, source expression(s) 214, and caster(s) 216 which may be applied to the data records that are processed by DMWT 104. For example, record-level transformation rules may be rules that are applied to an entire data record and may include a rule that commands DMWT 104 to run all or a subset of the mapping rules in the transformer on the legacy source data. An example of a field-level rule may be a mapping rule 214 that copies a source logical field name within source logical data model 122 into a destination logical field name within source logical data model 126. A mapping rule may further include a source expression 214. A source expression may be defined as a further refinement of a mapping rule. For example, in a license plate data record, the presence of certain letters may indicate specific automobile registration information such as a commercially-owned or government-owned vehicle. In this example, a "G" might be used at the end of a license plate number data entity to indicate that the vehicle is a government owned vehicle. A source expression 214 may determine the presence of the letter "G" at the end of a license plate number data datum and produce a Boolean value based on the presence of the letter (or lack thereof) that may be stored in storer 112.

Another example of DMWT 104 utilizing mapping rules 210, is the creation of surrogate keys within storer 112, each of which indirectly references a natural key of a single data datum in legacy source data file 106. Furthermore, a mapping rule may create a foreign key that is a referential constraint between two related data objects within storer 112. Another example of a DMWT mapping rule may be a rule that establishes a unique key for the natural key of each data datum in legacy source data file 106. A unique key may require that each natural key of a data datum be a singular key unto itself. In other words, the creation of a unique key ensures that duplicate legacy source data file datums will not be passed on to storer 112 and duplicates may be recorded in audit trail 114 as violations.

Additionally, rule set 208 may include a caster, which may be a script or piece of compiled code that may validate and transform a single typed datum to an output field. For example, a default caster may simply validate that the datum can represent a number (e.g. a caster of this type would be utilized when transforming a number in legacy data source file 106 to a number in storer 112). A more complex caster may do project-specific work such as extract the "year" component from a complex binary field that was used to store sequence numbers for assigning numbers to, for example, birth and death certificates.

After the transforming and migration of a pre-determined number of source data records through DMWT 104 (by applying rule set 208 to each data record) is complete, a number of destination records may have been formed and passed on to storer 112. Consequently, RDBMS 128 may then be populated with data object records. Unique keys and surrogate keys are valid for all data object records at this point; however, some foreign keys generated by DMWT 104 from natural key relationships in legacy source data file 106 may be invalid. DMWT 104 may then perform a referential integrity validation between legacy source data file 106 and the target database stored within RDBMS 128 (as described in further detail with regard to FIG. 4).

Data modernization system 100 may further include data migration workbench audit tool (DMWA tool) 134. DMWA tool 134 may be configured as a web interface such that a user of data migration workbench transformer 104 may view various audit statistics pertaining to a specific transform/migration data run compiled from audit logs reported to audit trail 114 via GUI 136. Some of these runtime statistics may include, key index performance (cache hits, disk reads, disk writes, for example), loader efficiency (blocked time, for example), log messages (info, warning, error, for example), referential integrity results (dangling foreign keys, source data records removed, foreign keys replaced by null, for example). Furthermore, a sampling of the runtime statistics displayed by DMWA tool 134 may also be displayed via DMWC 116 and GUI 130.

Various violation logs may be identified by DMWT 104 and reported to audit trail 114. DMWA tool 134 may then compile violation log data reported to audit trail 114 and distill at least a portion of the violation log data into audit statistics that may help a system user assess the performance of DMWT 104 during the related data migration/transformation.

An example of a violation log type may include a null field violation log where a source field in legacy data source file 106 is empty and a constraint in DMWT 104 and/or destination logical data model 126 is violated. Another example of a violation log type may include a typecast error violation log where a data datum in legacy data source file 106 has failed to satisfy the logical constraints of a rule within DMWT 104 that was utilized in a failed attempt to transform the corresponding data datum.

Another example of a violation log type may include a parse error where loader 110 has failed to parse a particular data datum from legacy data source file 106. Another example of a violation log type may include a duplicate natural key where a natural key used to generate primary surrogate keys occurs more than once in the legacy data source file. When DMWT 104 first encounters a natural key it may successfully generate a surrogate key. Subsequent occurrences of a specific natural key may generate a violation log of this type that may be entered into audit trail 114.

Another example of a violation log type may include a foreign key violation where surrogate and foreign keys were generated by DMWT 104 from natural key relationships in the legacy source data file 106. In other words, a foreign key may have been generated that does not point to an existing data datum in the legacy source data file. This is often referred to as a "dangling" foreign key. DMWT 104 may run cascading queries on legacy source data file 106 to find dangling foreign key relationships and may then produce dangling foreign key violation log entries and enter them into audit trail 114. The foreign key violation log entries may include the unique key of the specific data datum, the present case analysis repository natural key value of the specific data datum, and the surrogate key of the destination data object record, for example.

DMWA tool 134 may be configured to display migration/transformation audit statistics that represent the performance of DMWT 104 in varying degrees of detail during smaller or larger data migrations/transformations. For example, DMWA tool 134 may be configured to display audit statistics representing a large number of data records that were processed by the rule set of DMWT 104 and were reported to audit trail 114 as violation logs. In contrast, DMWA tool 134 may be configured to display information representing violation logs reported to audit trail 114 that correspond to individual data records. Thus, the versatility of DMWA tool 134 is evidenced in the capacity of the tool to provide both summary performance data of conversion engine 102 and data record-by-record migration/transformation granularity.

Figure 3:
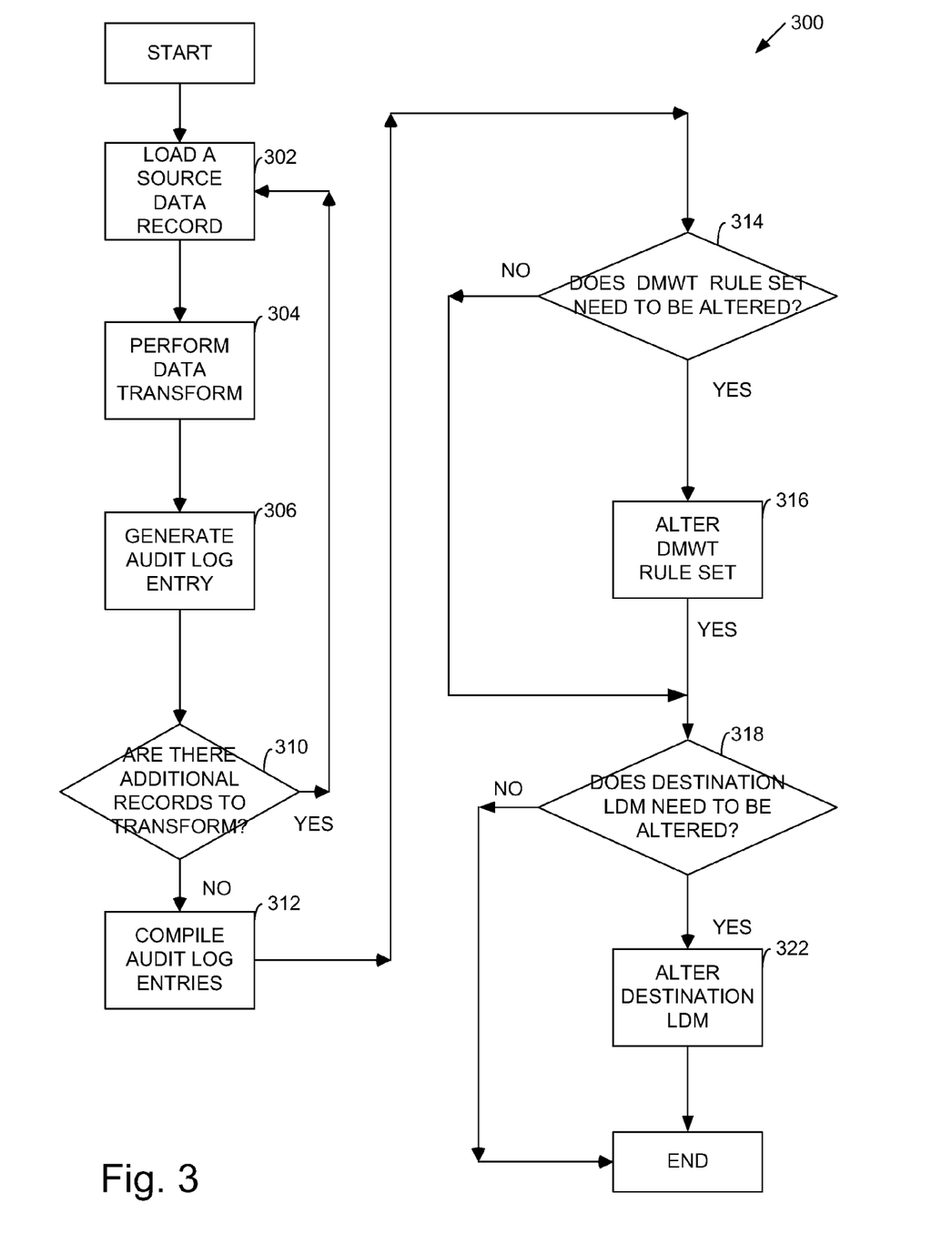
FIG. 3 shows a flow chart depicting an example routine illustrating the transform/migration of data through the data modernization system of FIG. 1 and a system user analysis of transform/migration audit statistics compiled by the audit interface tool of FIG. 1

FIG. 3 shows a flow chart depicting an example routine illustrating the transform/migration of data through the data modernization system of FIG. 1 and a system user analysis of transform/migration audit statistics compiled by the audit interface tool of FIG. 1. At 302, a source data record may be loaded by loader 112. At 304, DMWT 104 may transform the data record and migrate the data record to storer 112. At 306, an audit log may be generated by DMWT 104 and reported to audit trail 114. At 310, it may be determined whether there are additional records to be transformed/migrated. If the answer at 310 is yes, then the routine may return to 302. If the answer at 310 is no, then the routine may proceed to 312.

At 312, data migration workbench audit tool 134 may compile audit log entries from audit trail 114 into various audit statistics that a system user may utilize to determine if rule set 208, encompassed by DMWT 104, or destination logical model 126 needs to be modified by a system user to improve the overall performance of conversion engine 102. At 314, a system user or automated process may determine, based on an analysis of audit statistics displayed by DMWA tool 134, if rule set 208 encompassed by DMWT 104 needs to be altered. If the answer at 314 is no, then the routine may proceed to 318. If the answer at 314 is yes, then the routine may proceed to 316.

At 316, a system user may alter rule set 208. For example, a mapping rule 220, caster 216, or source expression 214 may be rewritten to be more constrained or less constrained so as to produce a desired migration/transformation outcome. At 318, a system user may determine, based on an analysis of audit statistics compiled and displayed by DMWA tool 134, if destination logical data model 126 needs to be altered to improve the overall performance of conversion engine 102. If the answer at 318 is no, then the routine is ended. If the answer at 318 is yes, then the routine proceeds to 322. At 322, a system user may alter destination logical data model 126, (for example by adding an additional variable to a field within logical data model 126 that may be received as an acceptable value within the specific field), to improve the overall performance of conversion engine 102.

Routine 300 may be applied to varying amounts of legacy source data. For example, a system user may wish to apply a specific rule within rule set 208 to only a single data source data record so as to minimize any unforeseen effects caused by a data migration/transform that applies the specific rule to the legacy source data. Alternatively, larger amounts of legacy source data may be processed by DMWT 104 to produce a larger number of audit log entries from which DMWA tool 134 may cull various audit statistics from. This versatility allows for both a larger summary level scale and smaller individual data record scale of conversion engine performance analysis to be applied to a data migration/transformation. For example, a system user may perform a full data migration for five million legacy data records. Accordingly this system user may utilize DMWA tool 134 to ascertain statistics that describe the overall performance and/or efficiency of the entire data migration of the five million records.

In some embodiments, a system user may utilize DMWA tool 134 to drill down to the specific genre of record violation, such as parse error violations, as an example. Furthermore, a system user may drill down with field level resolution with the DMWA to distill out migration errors that occurred in specific field(s). For example, the source datum (string) 20071099 may be the subject of a failed migration by DMWT 104 from legacy source data file 106 to a date field within RDBMS 128. With this source datum, DMWT 104 may produce a default date caster violation such as "99 is not a valid date for October, 2007". This violation, however, will be grouped with like violations and will be obfuscated to the system user when DMWA tool 134 is utilized to produced higher-level overall migration efficiency and/or performance statistics. If desired, however, a system user may drill down via DMWA tool 134 and GUI 130 to view actual per-field level data pertaining to a specific migration violation. At this point, a system user may modify the code embodied by the specific caster to mitigate future occurrences of the specific violation. It allows for a system user to identify and modify a specific rule or rules within rule set 208 that are the root cause of a smaller number of migration violations. Thus, the versatility of DMWA tool allows for a user to perform a triage between rules that are the root cause of varying numbers of migration violations and to first modify the rule(s) that are the root cause of the largest number of migration violations.

Figure 4A:
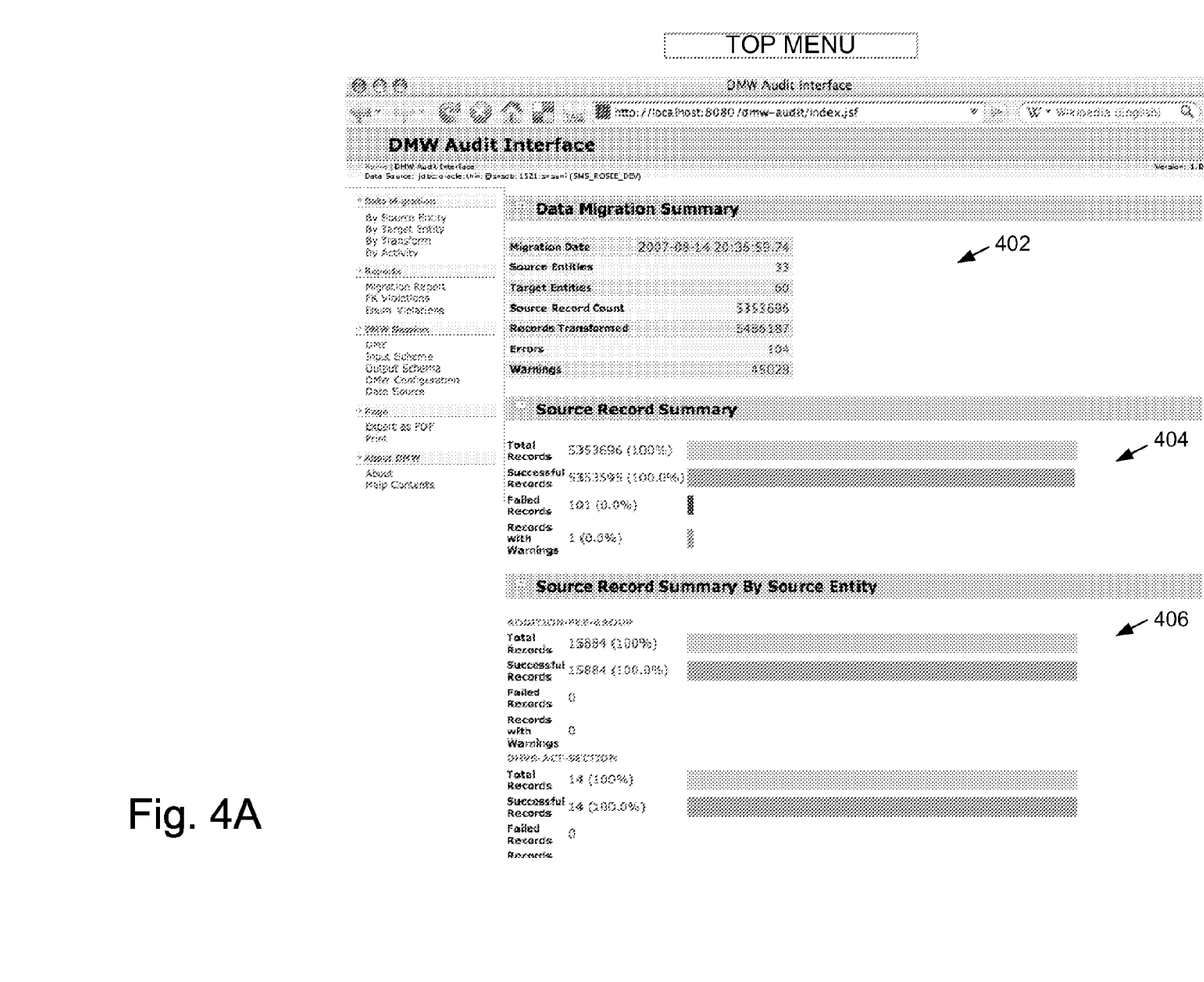
FIGS. 4A-4E show various example screenshots of the audit interface tool of FIG. 1.
Figure 4B:
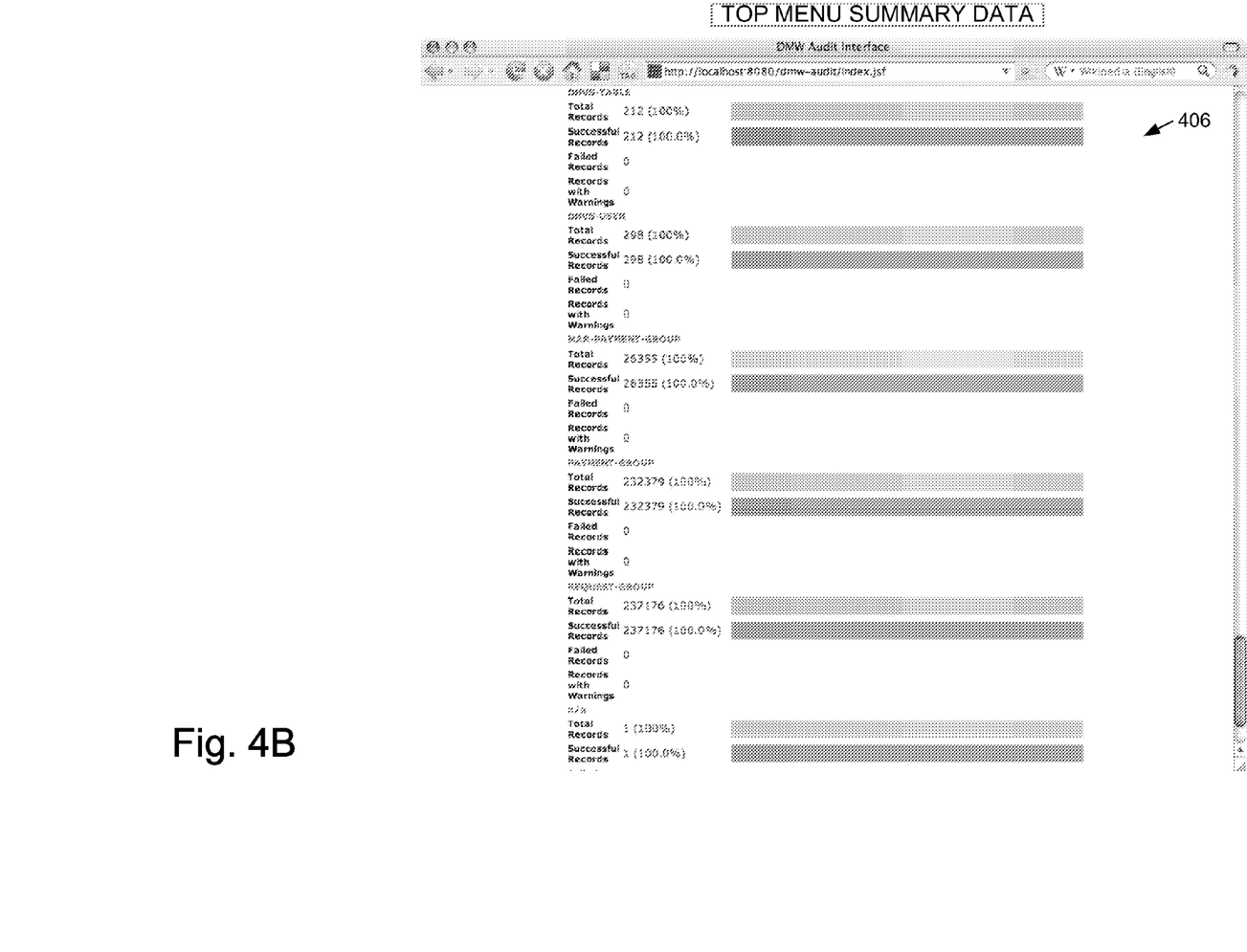

FIGS. 4A-4E show various example screenshots of the audit interface tool of FIG. 1. FIGS. 4A and 4B show example screen shots of DMWA tool 134 that illustrates summary data for a data migration/transform. At 402, some non-limiting examples of audit statistics that 134 DMWA tool 134 may display to a system user (via GUI 136) are number of source entities, number of target entities, number of source data records, number of source data records successfully transformed, and the number of migration/transform errors and warnings. At 404, some non-limiting examples of audit statistics that 134 DMWA tool 134 may display to a system user (via GUI 136) are the total number of source data records that were processed, the total number of source data records that were successfully migrated/transformed by DMWT 104, the total number of source data records that were unsuccessfully migrated/transformed by DMWT 104, and the total number of source data records that were successfully migrated/transformed by DMWT 104 but also produced a warning to audit trail 114 indicative of a non-fatal imperfection detected by DMWT 104.

At 406, entity level summary data may be provided by DMWA tool 134 via GUI 136. Non-limiting examples of entity level audit statistics that may be provided may include, but are not limited to, total number of source data records processed by DMWT 104 for a specific entity, total number of source data records successfully migrated/transformed, total number of data source records unsuccessfully migrated/transformed (failed), and the total number of data source records that were successfully migrated/transformed by DMWT 104 but also produced a warning to audit trail 114 that may be indicative of a non-fatal imperfection detected by DMWT 104.

Figure 4C:
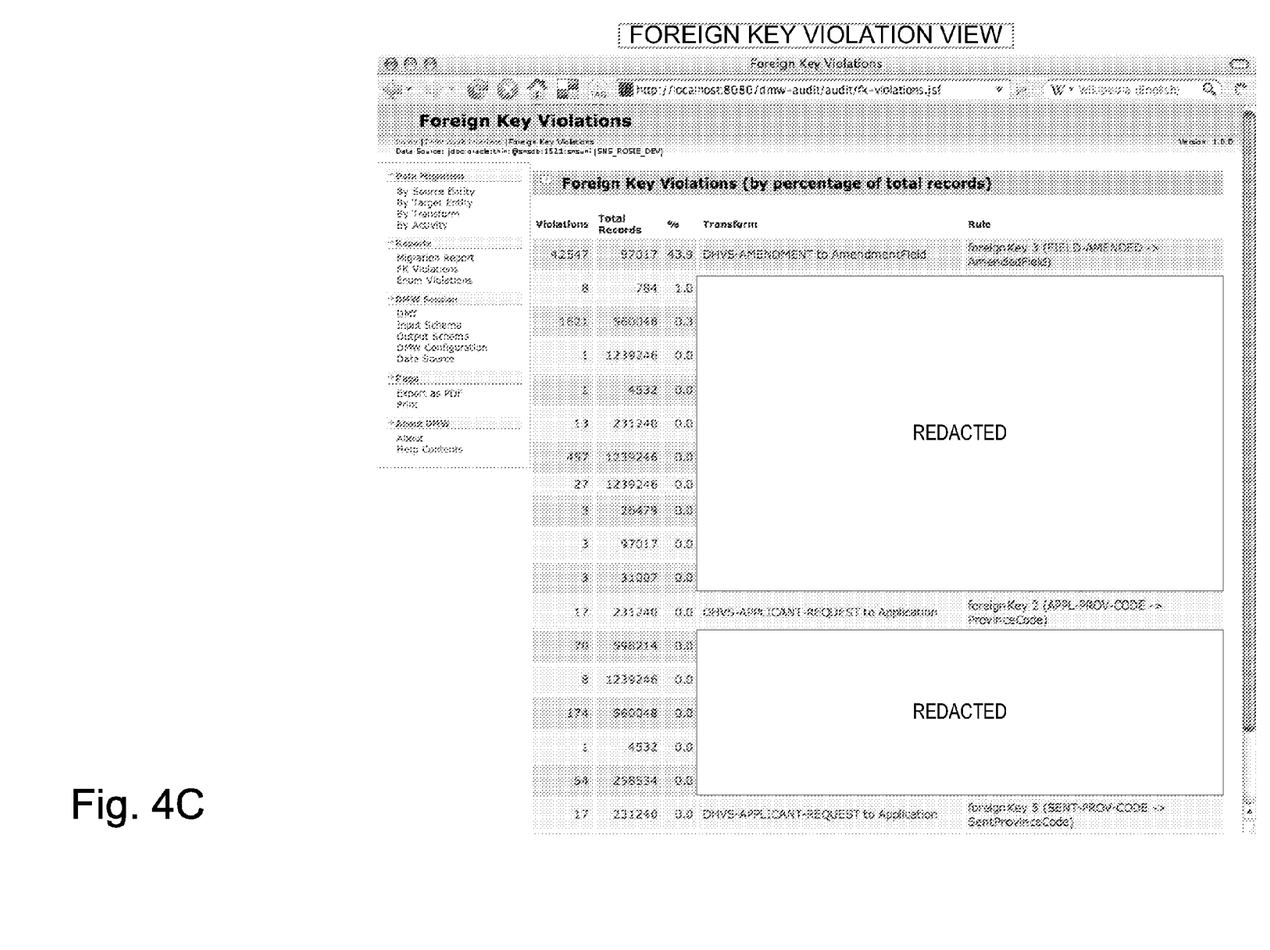
Figure 4D:
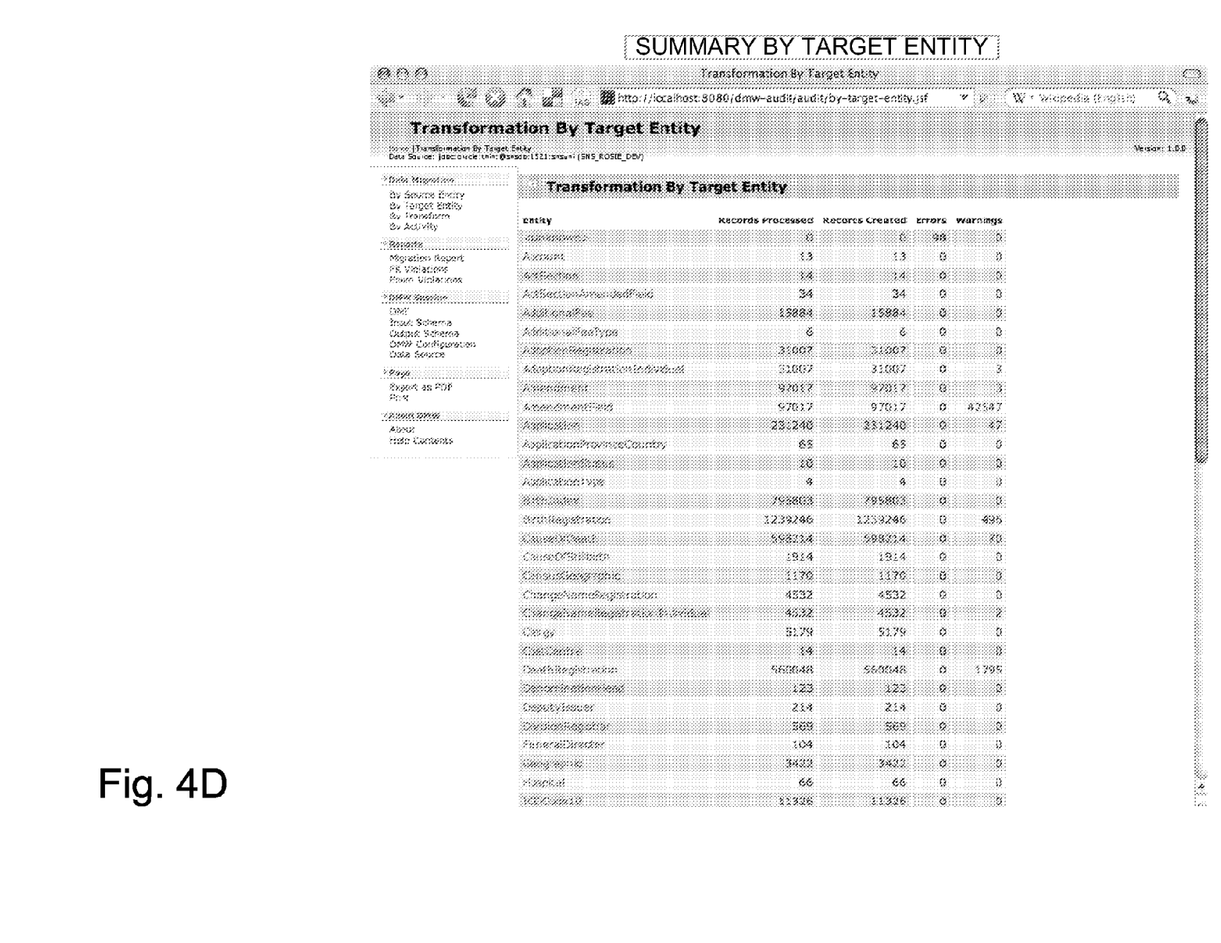

FIG. 4C shows an example screen shot of DMWT 104 that displays the total number of data source records processed by DMWT 104 that utilized a specific transformation rule within rule set 208 during a specific data run and the total number those transformation operations that were reported to audit trail 114 as violation logs during the data run. FIG. 4D shows the number of source data records processed by DMWT 104 by target entity, the number of source data records successfully transformed/migrated by DMWT 104 by target entity, and the number of source data records that were unsuccessfully transformed/migrated by DMWT 104, and the total number of data source records that were successfully migrated/transformed by DMWT 104 by target entity but also produced a warning to audit trail 114 that may be indicative of a non-fatal imperfection detected by DMWT 104.

Figure 4E:
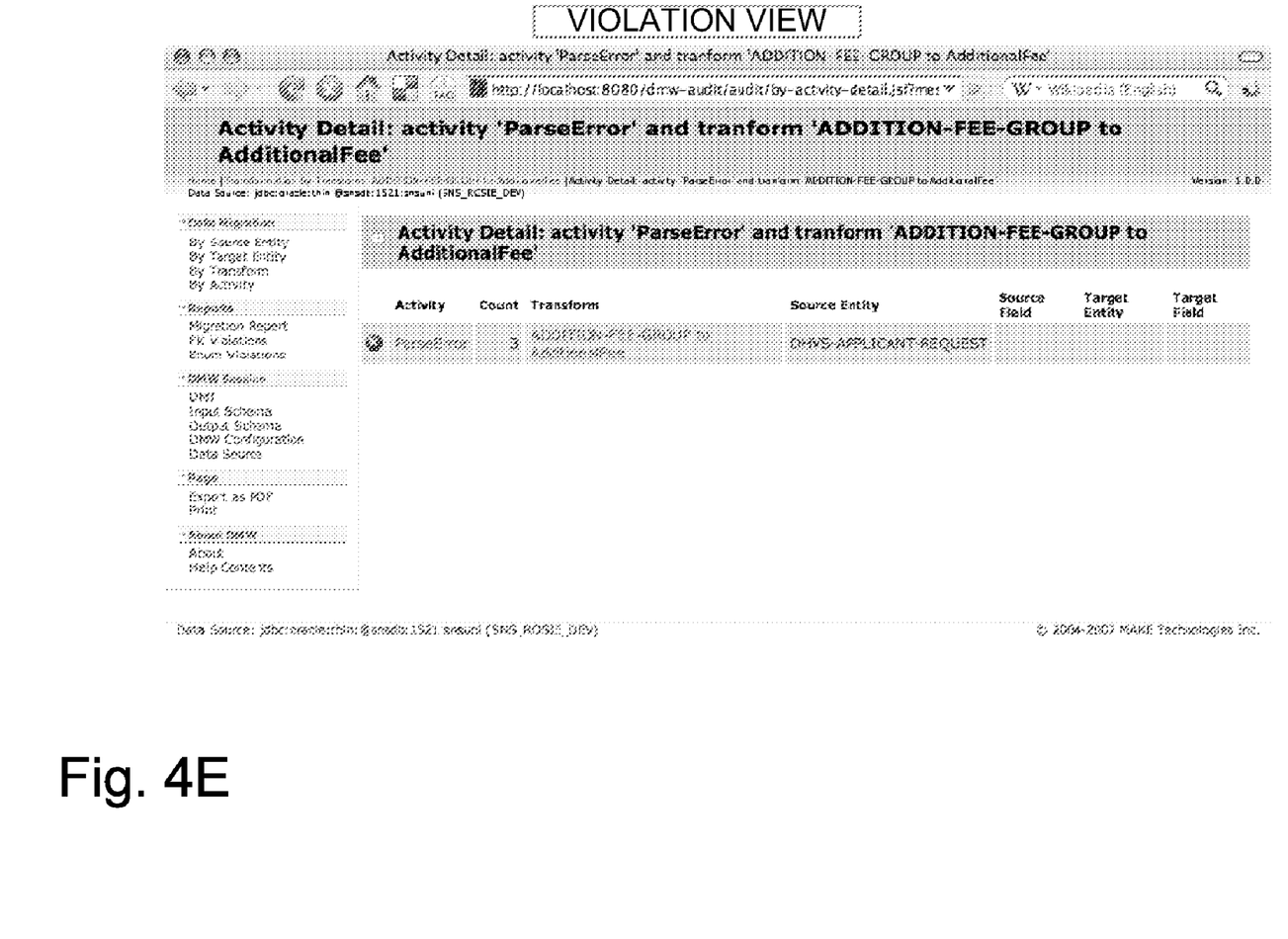

FIG. 4E shows a specific transform operation cross-referenced with the number of times that a specific type of violation log(in this example, an error during the parsing of a source data record by loader 110) occurred when the transform operation was performed. This illustrates the capacity of DMWA tool 134 to identify specific transform/migration errors with record-level granularity.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A database modernization auditing method executed on a computing device, comprising:

loading a source data object from a source data file;

transforming the source data object into a target data object according to a rule set, wherein transforming the source data object into the target data object further includes parsing at least a portion of the source data object into semantic information, transforming the semantic information into the target data object, and logging one or more violations in an audit trail, the audit trail configured to log a set of distinct audit units created during a data modernization run, the rule set including at least one of a record-level transformation rule, a field level rule, a source expression, and a caster;

identifying one or more instances of a first type of violation that occurs while parsing at least a portion of the source data object to the semantic information;

reporting to the audit trail one or more first audit log entries in response to the one or more instances of the first type of violation that occurs while parsing at least a portion of the source data object to the semantic information, wherein the violations of the first type are logged in a distinct audit unit of the set, which contains a unique identifier that is used to identify the source data object related to the distinct audit unit;

identifying one or more instances of a second type of violation that occurs while transforming the semantic information into the target data object, the second type of violation different than the first type of violation;

reporting to the audit trail one or more second audit log entries in response to the one or more instances of the second type of violation that occurs while transforming the semantic information into the target data object, wherein the violations of the second type are logged in the distinct audit unit containing the unique identifier that is used to identify the source data object related to the distinct audit unit; and displaying audit statistics pertaining to a specific transformation data run compiled from occurrences of the first audit log entries and the second audit log entries reported to the audit trail, the rule set further including more than one of a record-level transformation rule, a field level rule, a source expression, and a caster, the method further comprising generating an audit log entry corresponding to a plurality of violations including one or more of the first type of violation and the type of second violation, wherein an audit log including the audit log entries can be viewed at a level of each rule in the rule set.

2. The database modernization auditing method of claim 1, wherein the source data object is one of a field, a data record, an arbitrarily defined set of data records, or an entire database.

3. The database modernization auditing method of claim 1, further comprising changing rules in the rule set based upon one of the first audit log entries and the second audit log entries.

4. The database modernization auditing method of claim 1, further comprising at least one of detecting a dynamic change in a source program that contained the source data object and detecting an error introduced by a change in the rule set.

5. The database modernization auditing method of claim 1, further comprising using an audit tool to view or adjust components of the database modernization auditing method.

6. A computer-readable storage device comprising computer-executable instructions for auditing a database modernization, the instructions being executable by a computing device of a modernization system to:
    load a source data object from a source data file;
    transform the source data object into a target data object according to a rule set, wherein to transform the source data object into the target data object further includes instructions to parse at least a portion of the source data object into semantic information, instructions to transform the semantic information into the target data object, and instructions to log violations in an audit trail, the audit trail configured to log a set of distinct audit units created during a data modernization run;
    identify one or more instances of a first type of violation in parsing at least a portion of the source data object to the semantic information;
    report to the audit trail one or more first audit log entries in response to the one or more instances of the first type of violation in parsing at least a portion of the source data object to the semantic information, wherein the violations of the first type are logged in a distinct audit unit of the set, which contains a unique identifier that is used to identify the source data object related to the distinct audit unit;
    identify one or more instances of a second type of violation in transforming the semantic information into the target data object, the second type of violation different than the first type of violation;
    report to the audit trail one or more second audit log entries in response to the one or more instances of the second type of violation in transforming the semantic information into the target data object, the violations of the second type are is logged in the distinct audit unit containing the unique identifier that is used to identify the source data object related to the distinct audit unit;
    identify one or more instances of a third type of violation in response to a foreign key violation, wherein a dangling foreign key is generated which associates the target data object with a data element that does not exist in the source data file, the third type of violation different from each of the first type of violation and the second type of violation;
    report to the audit trail one or more third audit log entries in response to the one or more instances of the third type of violation, wherein the violations of the third type are logged in the distinct audit unit containing the unique identifier that is used to identify the source data object related to the distinct audit unit; and
    displaying audit statistics pertaining to a specific transformation data run compiled from occurrences of the first audit log entries, the second audit log entries, and the third audit log entries reported to the audit trail.

7. The computer-readable storage device of claim 6, wherein the source data object is one of a field, a data record, an arbitrarily defined set of data records, or an entire database.

8. The computer-readable storage device of claim 6, wherein the rule set includes at least one of a record-level transformation rule, a field level rule, a source expression, and a caster.

9. The computer-readable storage device of claim 6, further comprising instructions for changing rules in the rule set based upon one of the first audit log entries and the second audit log entries.

10. The computer-readable storage device of claim 9, further comprising instructions to provide an audit tool to view or adjust components of the rule set.

11. The computer-readable storage device of claim 6, further comprising instructions for at least one of detecting a dynamic change in a source program that contained the source data object and detecting an error introduced by a change in the rule set.

12. A database modernization auditing system, comprising a computing device configured to execute a conversion engine having a graphical user interface, the conversion engine including:
    a loader to provide a source data object from a source data file;
    a transformer coupled with the loader, the transformer configured to,
        receive the source data object from the loader and transform the source data object into a data object according to a rule set,
        parse at least a portion of the source data object into semantic information and transform the semantic information into the target data object,
        log violations in an audit trail, the audit trail configured to log a set of distinct audit units created during a data modernization run, wherein the transformer, to log the violations, is further configured to:
            identify one or more instances of a first type of violation in parsing at least a portion of the source data object to the semantic information,
            report to the audit trail one or more first audit log entries in response to the one or more instances of the first type of violation in parsing at least a portion of the source data object to the semantic information, wherein the violations of the first type are logged in a distinct audit unit of the set, which contains a unique identifier that is used to identify the source data object related to the distinct audit unit, identify one or more instances of a second type of violation in transforming the semantic information into the target data object, the second type of violation different than the first type of violation, report to the audit trail one or more second audit log entries in response to the one or more instances of the second type of violation in transforming the semantic information into the target data object, wherein the violations of the second type are logged in the distinct audit unit containing the unique identifier that is used to identify the source data object related to the distinct audit unit, identify one or more instances of a third type of violation in response to a foreign key violation, wherein a dangling foreign key is generated which associates the target data object with a data element that does not exist in the source data file, the third type of violation different from each of the first type of violation and the second type of violation, report to the audit trail one or more third audit log entries in response to the one or more instances of the third type of violation, wherein the third type of violation is logged in the distinct audit unit containing the unique identifier that is used to identify the source data object related to the distinct audit unit, and compile data for occurrences of each of the first type of violation, the second type of violation, and the third type of violation reported to the audit trail in order to display audit statistics, the audit statistics comprising one or more of key index performance, loader efficiency, log messages, and referential integrity results.

13. The database modernization auditing system of claim 12, wherein the source data object is one of a field, a data record, an arbitrarily defined set of data records, or an entire database.

14. The database modernization auditing system of claim 12, wherein the rule set includes at least one of a record-level transformation rule, a field level rule, a source expression, and a caster.

15. The database modernization auditing system of claim 12, further comprising means for changing rules in the rule set based upon one of the first audit log entries, the second audit log entries, and the third audit log entries.

16. The database modernization auditing system of claim 12, further comprising at least one of means for detecting a dynamic change in a source program that contained the source data object and means for detecting an error introduced by a change in the rule set.

17. The database modernization auditing system of claim 12, further comprising an audit tool to view or adjust components of the database modernization auditing system.

* * * * *

UNITED STATES PATENT AND TRADEMARK OFFICE
CERTIFICATE OF CORRECTION

| | | |
|---|---|---|
| PATENT NO. | : 8,150,896 B2 | Page 1 of 1 |
| APPLICATION NO. | : 11/963683 | |
| DATED | : April 3, 2012 | |
| INVENTOR(S) | : Christian Cotichini, Michael E. F. White and David John Green | |

It is certified that error appears in the above-identified patent and that said Letters Patent is hereby corrected as shown below:

IN THE CLAIMS:

In Column 10:

On Line 1, in Claim 6, remove "is" before the words "logged in".

Signed and Sealed this
Twenty-sixth Day of June, 2012

David J. Kappos
*Director of the United States Patent and Trademark Office*